(12) United States Patent
Kinugasa et al.

(10) Patent No.: US 8,308,357 B2
(45) Date of Patent: Nov. 13, 2012

(54) FLUORESCENT TEMPERATURE SENSOR

(75) Inventors: Seiichiro Kinugasa, Tokyo (JP);
Atsushi Kato, Tokyo (JP)

(73) Assignee: Azbil Corporation, Tokyo (JP)

( * ) Notice: Subject to any disclaimer, the term of this patent is extended or adjusted under 35 U.S.C. 154(b) by 184 days.

(21) Appl. No.: 12/396,567

(22) Filed: Mar. 3, 2009

(65) Prior Publication Data

US 2009/0245326 A1 Oct. 1, 2009

(30) Foreign Application Priority Data

Mar. 31, 2008 (JP) ................................. 2008-092081

(51) Int. Cl.
*G01K 11/00* (2006.01)
*G01K 1/00* (2006.01)
*G01J 5/00* (2006.01)

(52) U.S. Cl. ..................... 374/161; 374/131; 374/120

(58) Field of Classification Search .................. 374/161, 374/131, 120
See application file for complete search history.

(56) References Cited

U.S. PATENT DOCUMENTS

| | | | | |
|---|---|---|---|---|
| 4,354,105 A * | 10/1982 | Spirig | ........................ | 250/231.1 |
| 4,558,217 A * | 12/1985 | Alves | ...................... | 250/227.23 |
| 4,560,286 A * | 12/1985 | Wickersheim | ............... | 374/131 |
| 4,592,664 A * | 6/1986 | Bijlenga et al. | .............. | 374/131 |
| 4,997,286 A * | 3/1991 | Fehrenbach et al. | .......... | 374/131 |
| 5,036,194 A * | 7/1991 | Hazel | ...................... | 250/227.21 |
| 5,255,980 A * | 10/1993 | Thomas et al. | ............... | 374/161 |
| 5,351,268 A * | 9/1994 | Jensen et al. | .................. | 374/131 |
| 5,363,463 A * | 11/1994 | Kleinerman | .................. | 385/123 |
| 5,470,155 A | 11/1995 | Jensen | | |
| 5,556,204 A * | 9/1996 | Tamura et al. | ................ | 374/161 |
| 5,606,170 A * | 2/1997 | Saaski et al. | ............... | 250/458.1 |
| 5,779,365 A * | 7/1998 | Takaki | ........... | 374/161 |
| 5,893,643 A * | 4/1999 | Kumar et al. | ................. | 374/131 |
| 6,045,259 A * | 4/2000 | Djeu | ............. | 374/161 |
| 6,373,573 B1* | 4/2002 | Jung et al. | ..................... | 356/419 |
| 2003/0016359 A1* | 1/2003 | Jung et al. | ..................... | 356/419 |
| 2004/0004990 A1* | 1/2004 | Khan | ............... | 374/161 |
| 2006/0140248 A1* | 6/2006 | Gotthold et al. | ............. | 374/161 |
| 2009/0022205 A1* | 1/2009 | Comendant | .................... | 374/161 |
| 2009/0135881 A1* | 5/2009 | Kinugasa et al. | ............. | 374/161 |
| 2009/0296779 A1* | 12/2009 | Lee | ............................ | 374/170 |

FOREIGN PATENT DOCUMENTS

JP 58-170528 U 11/1983
JP 62-298734 A 12/1987

* cited by examiner

*Primary Examiner* — Mirellys Jagan
(74) *Attorney, Agent, or Firm* — McDermott Will & Emery LLP

(57) ABSTRACT

To provide a fluorescent temperature sensor wherein light is propagated reliably with an easy adjustment. A fluorescent temperature sensor for producing a temperature signal from fluorescent light of an optically excited fluorescent material includes: a light emitting device for projecting light to the fluorescent material; a photoreceiving element for receiving fluorescent light emitted from the fluorescent material 1; a case for housing both the light emitting device and the photoreceiving element; and an optical fiber, between the case and the fluorescent material, for propagating the light of both the light emitting device and the fluorescent material. The case and the optical fiber are positioned so that the light from the light emitting device is received within the optical fiber, and so that the light from the fluorescent material is incident on the photoreceiving element from within the optical fiber.

3 Claims, 4 Drawing Sheets

FLUORESCENT TEMPERATURE SENSOR

CROSS-REFERENCE TO RELATED APPLICATIONS

The present application claims priority under U.S.C. §119 to Japanese Patent Application No. 2008-092081, filed Mar. 31, 2008. The contents of this application is incorporated herein by referenced in its entirety.

TECHNICAL FIELD

The present invention relates to a fluorescent temperature sensor for producing a temperature signal from a fluorescent light of a fluorescent material that has undergone optical excitation.

BACKGROUND OF ART

As this type of optical temperature sensor there is, for example, a known fluorescent temperature sensor wherein a light source, as a light emitting device and a photoreceiving element are spatially separated, as illustrated in U.S. Pat. No. 5,470,155 ("the '155 patent"). In this fluorescent temperature sensor, light from a light source is caused to be incident on an optical fiber that faces a fluorescent material, through the half mirror or a dichroic mirror on the one hand, and the fluorescent light that is emitted from the fluorescent material is caused to illuminate the photoreceiving element through the half mirror or dichroic mirror.

SUMMARY OF THE INVENTION

However, in the conventional fluorescent temperature sensor of the '155 patent, it is necessary to perform alignments twice: the adjustment (of the alignment of the light source relative to the optical fiber) for causing the light from the light source to be incident on the optical fiber, and the adjustment (of the alignment of the photoreceiving element relative to the optical fiber) in order to cause the light from the fluorescent material to be incident on the photoreceiving element. Additionally, because a half mirror or a dichroic mirror is used, it is also necessary to adjust the angle thereof. Because of this, the manufacturing process is complex, and not only does this decrease the productivity, but there is also a shortcoming in that this leads to increases in the product cost.

Given this, in contemplation of the situation set forth above, the object of the present invention is to provide a fluorescent temperature sensor wherein the light can be propagated reliably through simple adjustments.

The fluorescent temperature sensor of a first invention is a fluorescent temperature sensor for producing a temperature signal from fluorescent light of a fluorescent material that has been optically excited, comprising: a light emitting device for projecting light onto the fluorescent material; a photoreceiving element or receiving fluorescent light that is emitted from the fluorescent material; a case housing both the photoreceiving element and the light emitting device; and a light propagating medium for conducting, between the case and the fluorescent material, both the light that is emitted from the light emitting device and the fluorescent light that is emitted from the fluorescent material; wherein: the case and the light propagating medium are connected at a position wherein the light that is emitted by the light emitting device is received within the light propagating medium and the fluorescent light that is emitted from the fluorescent material is incident on the photoreceiving element from within the light propagating medium.

In the fluorescent temperature sensor of the first invention, the light propagating medium and the case are connected in a position wherein the light that is emitted from the light emitting device is incident into the light propagating medium and the fluorescent light that is emitted from the fluorescent material is incident on the photoreceiving element from within the light propagating medium. Because of this, there is no need for the alignment of the light emitting device and the light propagating medium, nor for the alignment of the photoreceiving element and the light propagating medium, making it possible to conduct the light reliably through the simple adjustment of disposing the photoreceiving element and the light emitting device appropriately within the case.

The fluorescent temperature sensor of a second invention is the fluorescent temperature sensor as set forth in the first invention, wherein the light propagating medium is an optical fiber; and the optical fiber is connected to the case so that the core of the optical fiber is positioned within the range of directional characteristics of the light emitting device, and the photoreceiving element is positioned within the range of the aperture angle of the optical fiber.

With the lessons temperature sensor as set forth in the second invention, when the light propagating medium is a simple optical fiber, it is possible to cause the light that is emitted by the light emitting device to be incident into the core by positioning the core of the optical fiber within the range of the directional characteristics of the light emitting device. On the other hand, it is possible to cause the fluorescent light that is emitted from the fluorescent material to be incident on to the photoreceiving element through positioning the photoreceiving element within the range of the aperture angle of the optical fiber. Given this, it is possible to reliably conduct the light, even when using a single fiber, through a simple adjustment of positioning the light emitting device and the photoreceiving element within the case as described above.

The fluorescent temperature sensor as set forth in the third invention is a fluorescent temperature sensor as set forth in the first invention, wherein the light propagating medium is a fiber optic bundle wherein a plurality of optical fiber element fibers are bundled together; and the fiber optic bundle is connected to the case by positioning the cores of at least a portion of the optical fiber element fibers of the fiber optic bundle within the range of the directional characteristics of the light emitting device, and the photoreceiving element is positioned within the range of the angle or aperture of at least a portion of the optical fiber element fibers of the fiber optic bundle.

In the fluorescent temperature sensor as set forth in the third invention, the light propagating medium being a fiber optic bundle, enables the light that is emitted from the light emitting device to be incident into the cores of the optical fiber element fibers through positioning the cores of a portion of those optical fiber element fibers comprising the fiber optic bundle within the scope of the directional characteristics of the light emitting device. On the other hand, it is possible to cause the fluorescent light that is emitted from the fluorescent materials to be incident onto the photoreceiving element by positioning the photoreceiving element within the scope of the aperture angle of a portion of the optical fiber element fibers that comprise the fiber optic bundle. This makes it possible to convey the light reliably, even when using a fiber optic bundle, through the simple adjustment of positioning the light emitting device and the photoreceiving element appropriately within the case as described above.

DETAILED DESCRIPTION OF THE PREFERRED EMBODIMENTS

A fluorescent temperature sensor according to one example of embodiment according to the present invention will be explained in reference to FIG. 1 through FIG. 5.

Figure 1:
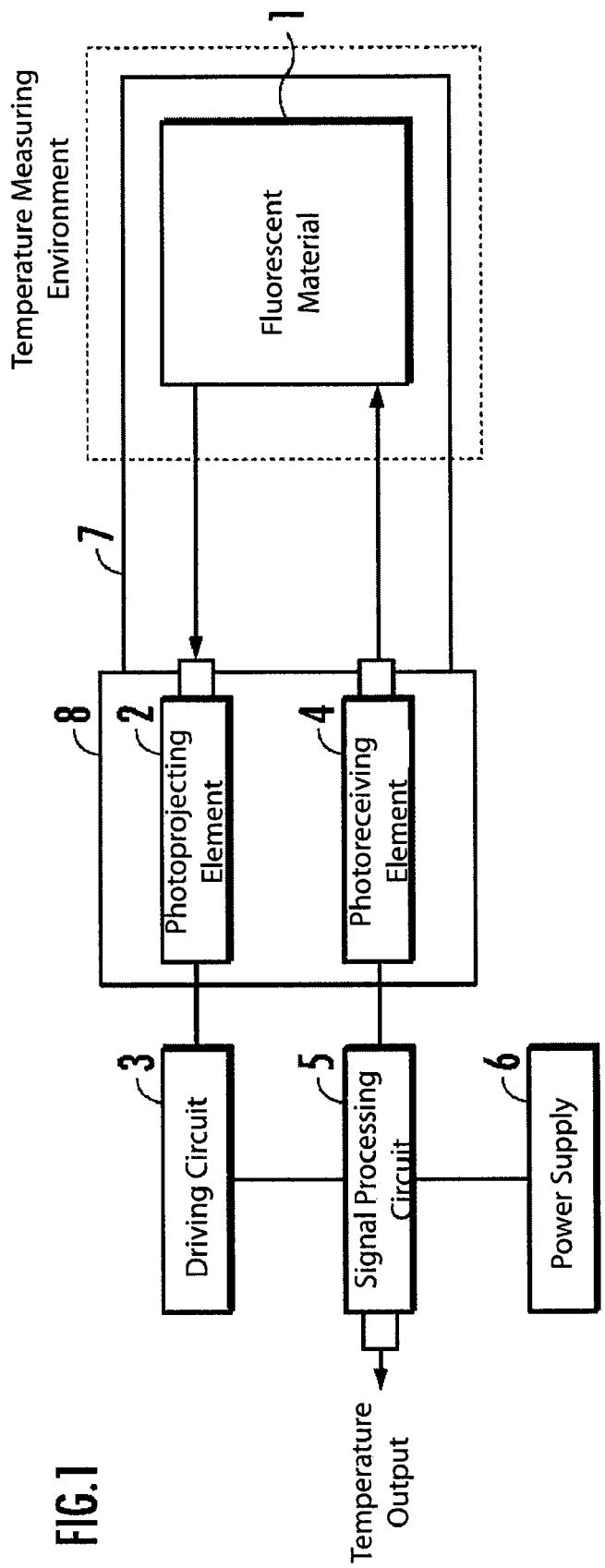
FIG. 1 is an overall structural diagram of a fluorescent temperature sensor according to the present example of embodiment.

The overall structure of the fluorescent temperature sensor according to the present example of embodiment will be explained in reference to FIG. 1. The fluorescent temperature sensor comprises: a fluorescent: material 1 that exhibits fluorescent characteristics that vary depending on the temperature; a light emitting device 2 for projecting light onto the fluorescent material 1; a driving circuit 3 for driving the light emitting device 2; a photoreceiving element 4 for receiving fluorescent light emitted from the fluorescent material 1; and a signal processing circuit 5 for generating and outputting a temperature signal in accordance with an output signal from the photoreceiving element 4. A power supply 6 is connected to the signal processing circuit 5, to supply, from the power supply 6, the electric power that is required for the operation of the fluorescent temperature sensor.

Additionally, the fluorescent temperature sensor further comprises an optical fiber 7 as light propagating means connecting between the fluorescent material 1, the light emitting device 2 and the photoreceiving element 4, and a case 8 for housing the light emitting device 2 and the photoreceiving element 4.

The light emitting device 2 is provided with an LED 21 of a specific wavelength. (See FIG. 2.) The driving circuit 3 applies a pulse current to the LED 21 to cause the period of emission of the LED 21 for a single measurement to be any time period between 2 ms and 500 ms.

The receiving element 4 is provided with a photodiode 41 (shown in FIG. 2) for measuring the luminosity (brightness) of the incident light. The signal processing circuit 5 measures the attenuation characteristics of the fluorescent light of the fluorescent material 1, measured by the photodiode 41, and measures, in particular, the fluorescent relaxation time. Additionally, the signal processing circuit 5 calculates and outputs the temperature of the temperature measurement environment in which the fluorescent material 1 exists, from the relationship (included in a data table, map, or the like) between the fluorescent relaxation time and the fluorescent material 1, which provided in advance.

Figure 2:
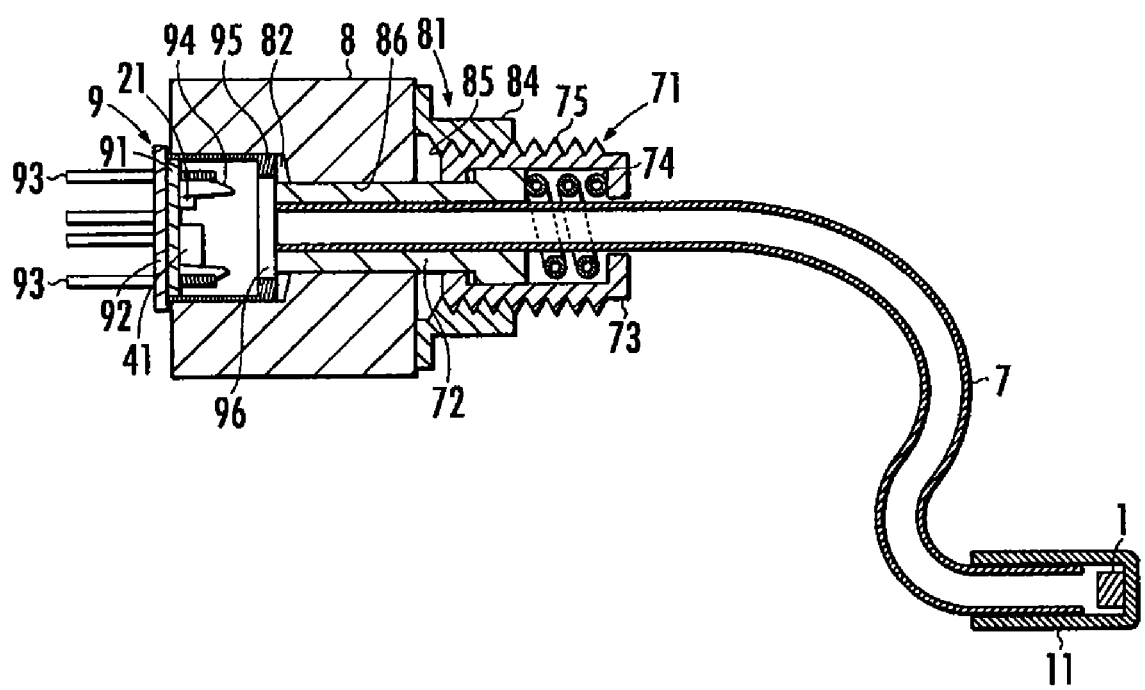
FIG. 2 is an explanatory diagram illustrating a specific structure of a fluorescent temperature sensor according to the present example of embodiment.

FIG. 2 will be referenced next to explain a specific structure of the fluorescent temperature sensor.

The fluorescent material 1 is disposed facing a core portion 7a (shown in FIG. 3) of an optical fiber 7 within a protective tube 11 provided so as to cover one end portion of the optical fiber 7.

The case 8 is provided with a connector receiving portion 81 as connecting means for connecting the optical fiber 7 to one end side, and a hollow internal space 82 wherein fits a tube-shaped module unit 9 containing the LED 21 and the photodiode 41 on the other end side.

The connector receiving portion 81 is a receiving portion corresponding to a connector 71 that is connected on the other end side of the optical fiber 7, where the connector receiving portion 81 and the connector 71 are objects that are already standardized based on JIS specifications, or the like, so detailed explanations thereof are omitted.

The connector receiving portion 81 comprises a tubular connecting portion 84 that protrudes to the outside of the case 8, a female screw groove 85 formed on the inner periphery of the connecting portion 84, and a plug portion 86 that communicates with the internal space 82 and into which the tip of the connector 71 is plugged. On the other hand, the connector 71 comprises a ferrule 72 into which the optical fiber 7 is inserted and integrated, a guide member 73 that fits around the ferrule 72 and which can slide in the axial direction to protect the ferrule 72, a coil spring 74 that applies a force on the ferrule 72 towards the tip end portion, and a male screw groove 75 formed on the outer periphery of the guide member 73.

The module unit 9 is disposed across a specific gap so that the LED 21 on the substrate 91, the photodiode 41, and the core portion 7a of the optical fiber 7 (shown in FIG. 3 and FIG. 4) will have the relationship described below. The bottom portion 92 is adjacent to the outside of the substrate 91, and a plurality of terminal electrodes 93 is provided penetrating through the substrate 91 and the bottom portion 92. Additionally, each of the terminal electrodes 93 is connected, directly or through a lead wire 94, to the LED 21 or the photodiode 41.

Additionally, the module unit 9 is provided with a casing 95 so as to cover over the substrate 91, including the LED 21 and the photodiode 41, from the bottom portion 92, and a window portion 96 is formed wherein quartz glass fits into a portion of the ceiling of the casing 95.

The positional relationship between the LED 21, the photodiode 41, and the optical fiber 7 will be explained next.

When the ferrule 72 of the connector 71 is plugged on to the plug portion 86 of the connector receiving portion 81, the tip end of the ferrule 72 comes into contact with a window portion 96 of a module unit 9 that is plugged over the inner space 82. Additionally, the male screw groove 75 and the female screw groove 85 are tightened by a tightening portion 84, to secure the connector 71 and the connector receiving portion 81. At this time, the tip end of the ferrule 72 is pushed by the force of the coil spring 74 into the window portion 96 of the module unit 9 to be held in this state.

Figure 3:
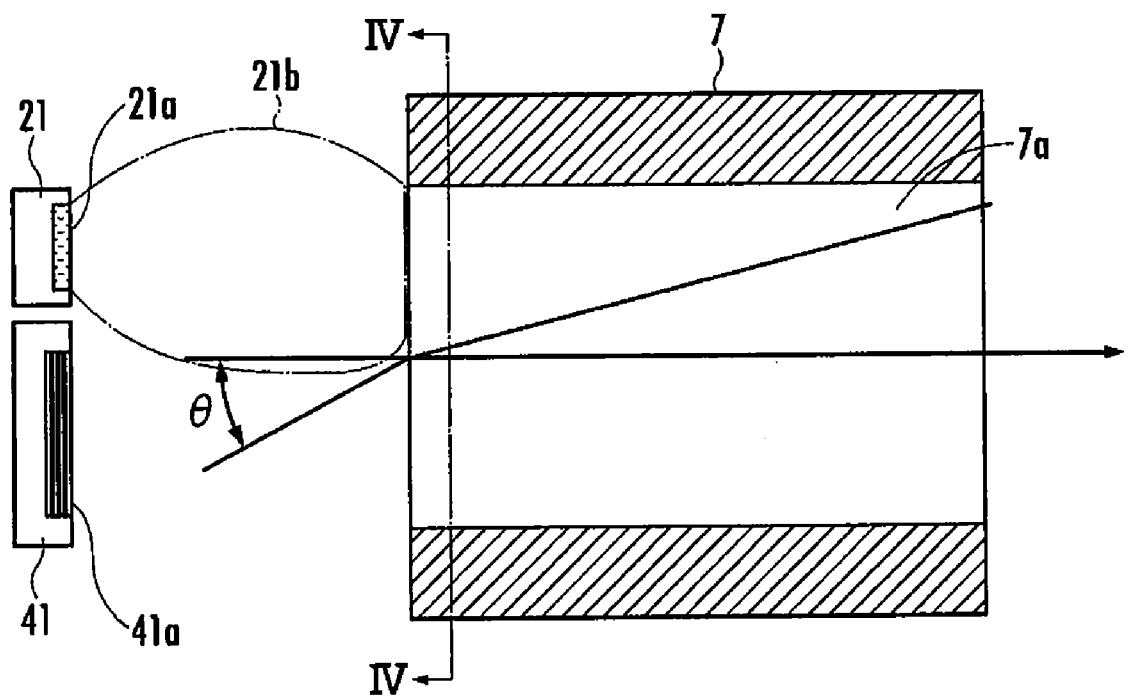
FIG. 3 is a diagram illustrating the positional relationship between the LED, the photodiode, and the optical fiber in FIG. 2.

In this way, in a state wherein the case 8 and the optical fiber 7 are connected, the light emitting portion 21a of the LED 21 and the photoreceiving portion 41a of the photodiode 41 are disposed facing the core portion 7a of the optical fiber 7, as illustrated schematically in FIG. 3. Specifically, the core portion 7a of the optical fiber 7 is positioned within the range 21b of the directional characteristics of the LED 21, and the photoreceiving portion 41a of the photodiode 41 is positioned within the range of the aperture angle θ that is determined by the core portion 7a of the optical fiber 7.

Figure 4:
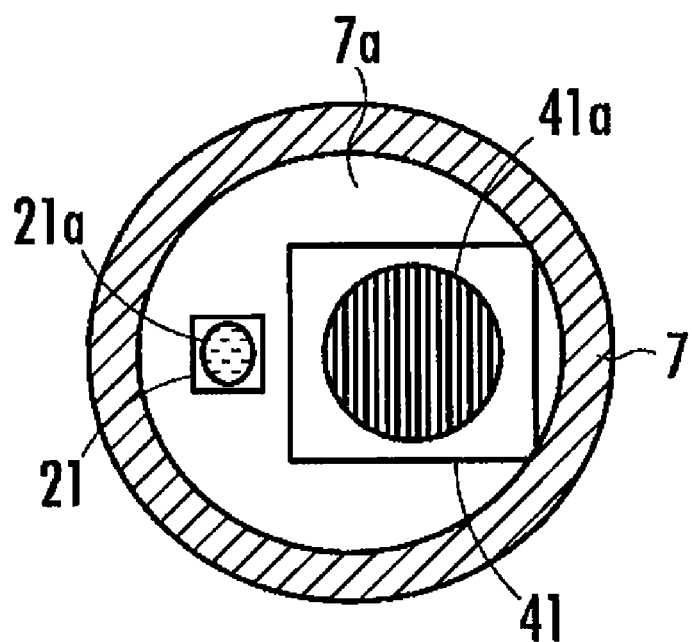
FIG. 4 is a partial cross-sectional diagram shown from the direction of the section IV-IV in FIG. 3.

As a result, the case 8 and the optical fiber 7 the light that is emitted from the light-emitting portion 21a of the LED 21 is received within the core portion 7a of the optical fiber 7, and the light from the fluorescent material 1 is incident on the photoreceiving portion 41a of the photodiode 41 from within the core portion 7a, as shown by the cross-sectional diagram in FIG. 4 of the components when viewed in the direction of the section IV-IV in FIG. 3.

Here, when the intensity of the light from the fluorescent material 1 is sensed in the photoreceiving portion 41a, a mixture of light that is emitted from the light-emitting portion 21a of the LED 21 and the light from the fluorescent material 1 is received, so there is the danger of not being able to sense the fluorescent light intensity correctly, and thus in practice preferably the structure is one wherein the light from the fluorescent material 1 is sensed immediately after the LED 21 has been turned off.

In this way, the fluorescent light temperature sensor of the present form of embodiment eliminates the need for the alignment between the LED 21, as the light emitting device 2, and the optical fiber 7, which is the light propagating medium, and eliminates the need for the alignment between the photodiode 41, as the photoreceiving element 4, and the optical fiber 7, and disposing the LED 21 and the photodiode 41 with a specific gap therebetween within the case 8 enables a simple structure to reliably perform photoprotection from the light emitting device 2 to the fluorescent material 1, and photoreception from the fluorescent material 1 to the photoreceiving element 4.

Figure 5:
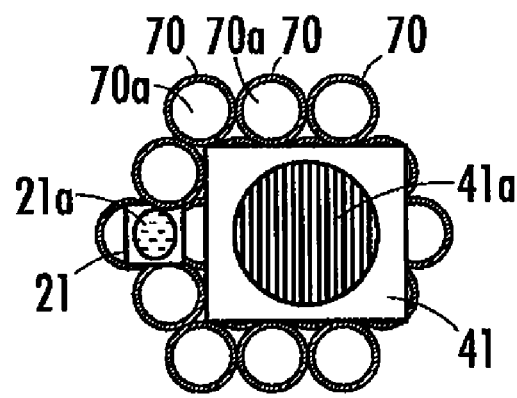
FIG. 5 is a partial cross-sectional diagram of a modified example of FIG. 4.

Note that although in the form of embodiment described above the light propagating medium is structured from a single optical fiber 7, the present invention is not limited thereto, but rather, as illustrated in FIG. 5, may be a fiber-optic bundle comprising a plurality of optical fiber element fibers 7. In this case, disposing the cores 70a of at least a portion of the optical fiber element fibers 70 of the fiber-optic bundle with in the range of the directional characteristics of the LED 21 enables the reliable illumination of the light from the LED 21 into the core portions [sic] 70a of the optical fiber element fibers 70. Additionally, positioning the photoreceiving portion 41a of the photodiode 41 within the scope of the aperture angle of at least a portion of the optical fiber element fibers 70 of the fiber-optic bundle enables the reliable illumination of the light from the fluorescent material 1 onto the photoreceiving portion 41a.

Additionally, while in the present form of embodiment a module unit 9 wherein the LED 21 and the photodiode 41 are disposed with a specific gap therebetween was fitted into an inner space 82 in the case 8, the present invention is not limited thereto, but rather the LED 21 and the photodiode 41 may be disposed directly in the case 8.

The invention claimed is:

1. A fluorescent temperature sensor for producing a temperature signal from fluorescent light of a fluorescent material that has been optically excited, comprising:
    a light emitting device projecting light onto the fluorescent material;
    a photoreceiving element receiving fluorescent light that is emitted from the fluorescent material;
    a case fitting a module unit containing both the photoreceiving element and the light emitting device on a substrate, and provided with a connector receiving portion and a plug portion; and
    a single light propagating medium conducting, between the light emitting device and the photoreceiving element at one end and the fluorescent material at an opposite end, both the light that is emitted from the light emitting device and the fluorescent light that is emitted from the fluorescent material,
    wherein the module unit disposes the photoreceiving element across a specific gap from the light emitting device,
    wherein the light propagating medium is connected to the case so that a core of the light propagating medium is positioned within the range of directional characteristics of the light emitting device, and the photoreceiving element is positioned within the range of an aperture angle of the light propagating medium,
    wherein the case and the single light propagating medium are connected at a position wherein the light that is emitted by the light emitting device is received within the single light propagating medium and the fluorescent light that is emitted from the fluorescent material is incident on the photoreceiving element from within the single light propagating medium, and
    wherein the light emitting device directly projects the light onto the single light propagating medium and the photoreceiving element directly receives the fluorescent light from the single light propagating medium,
    wherein the single light propagating medium is provided with a connector that is connected to the connector receiving portion of the case, the connector including
        a ferrule that is plugged into the plug portion of the case, and into which the single light propagating medium is inserted and integrated,
        a guide member that fits around the ferrule and slides in a direction of an axis of the guide member to hold the ferrule, and
        a coil spring that applies a force on the ferrule towards a tip end portion of the ferrule,
    wherein the module unit is provided with a window portion that is positioned between the plug portion of the case, and the light emitting device and the photoreceiving element, facing the light emitting device and the photoreceiving element, and
    wherein, a tip end of the ferrule is pushed by force of the coil spring toward the window portion of the module unit and comes into contact with the window portion when the single light propagating medium receives the light emitted from the light emitting device and projects the fluorescent light emitted from the fluorescent material onto the photoreceiving element.

2. The fluorescent temperature sensor as set forth in claim 1, wherein the single light propagating medium is an optical fiber.

3. A fluorescent temperature sensor for producing a temperature signal from fluorescent light of a fluorescent material that has been optically excited, comprising:
    a light emitting device projecting light onto the fluorescent material;
    a photoreceiving element receiving fluorescent light that is emitted from the fluorescent material;
    a case housing both the photoreceiving element and the light emitting device on a substrate, and provided with a connector receiving portion and a plug portion; and
    a single light propagating medium conducting, between the light emitting device and the photoreceiving element at one end and the fluorescent material at an opposite end, both the light that is emitted from the light emitting device and the fluorescent light that is emitted from the fluorescent material,
    wherein the case and the single light propagating medium are connected at a position wherein the light that is emitted by the light emitting device is received within the single light propagating medium and the fluorescent light that is emitted from the fluorescent material is incident on the photoreceiving element from within the single light propagating medium, wherein the single light propagating medium is a fiber optic bundle wherein a plurality of optical fiber element fibers are bundled together, wherein the fiber optic bundle is connected to the case by positioning cores of at least a portion of the optical fiber element fibers of the fiber optic bundle within a range of directional characteristics of the light emitting device, and the photoreceiving element is positioned within the range of an angle or aperture of at least a portion of the optical fiber element fibers of the fiber optic bundle, wherein the plurality of optical fiber element fibers each have a first bundled end and all the first bundled ends are incident on both the light emitting device and the photoreceiving element, wherein the light emitting device directly projects the light onto the single light propagating medium and the photoreceiving element directly receives the fluorescent light from the single light propagating medium, wherein the single light propagating medium is provided with a connector that is connected to the connector receiving portion of the case, the connector including a ferrule that is plugged into the plug portion of the case, and into which the single light propagating medium is inserted and integrated, a guide member that fits around the ferrule and slides in a direction of an axis of the guide member to hold the ferrule, and a coil spring that applies a force on the ferrule towards a tip end portion of the ferrule, wherein the case is provided with a window portion that is positioned between the plug portion of the case, and the light emitting device and the photoreceiving element, facing the light emitting device and the photoreceiving element, and wherein, a tip end of the ferrule is pushed by force of the coil spring toward the window portion of the case and comes into contact with the window portion when the single light propagating medium receives the light emitted from the light emitting device and projects the fluorescent light emitted from the fluorescent material onto the photoreceiving element.

\* \* \* \* \*